(12) United States Patent
Chen et al.

(10) Patent No.: US 8,749,699 B2
(45) Date of Patent: Jun. 10, 2014

(54) METHOD AND DEVICE FOR VIDEO PROCESSING USING A NEIGHBORING FRAME TO CALCULATE MOTION INFORMATION

(75) Inventors: Hai Chen, Shenzhen (CN); Haibo Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 13/273,743

(22) Filed: Oct. 14, 2011

(65) Prior Publication Data

US 2012/0033131 A1  Feb. 9, 2012

Related U.S. Application Data

(63) Continuation of application No. PCT/CN2010/071290, filed on Mar. 25, 2010.

(30) Foreign Application Priority Data

Apr. 16, 2009  (CN) .......................... 2009 1 0135223

(51) Int. Cl.
*H04N 5/235*  (2006.01)
*G03B 7/00*  (2006.01)

(52) U.S. Cl.
USPC ....................................... 348/362; 348/208.1

(58) Field of Classification Search
None
See application file for complete search history.

(56) References Cited

U.S. PATENT DOCUMENTS

| 6,441,845 | B1 | 8/2002 | Matsumoto |
| 6,952,234 | B2 | 10/2005 | Hatano |
| 7,053,946 | B2 | 5/2006 | Takahashi et al. |
| 7,193,652 | B2 | 3/2007 | Hori et al. |
| 2002/0118293 | A1* | 8/2002 | Hori et al. ..................... 348/362 |
| 2005/0243177 | A1* | 11/2005 | Kang et al. ................. 348/207.1 |
| 2006/0170780 | A1* | 8/2006 | Turley et al. ............... 348/208.1 |
| 2006/0290821 | A1* | 12/2006 | Soupliotis et al. ............ 348/701 |
| 2009/0213244 | A1* | 8/2009 | Seo et al. ................... 348/230.1 |
| 2010/0103194 | A1 | 4/2010 | Chen et al. |

FOREIGN PATENT DOCUMENTS

| CN | 1370289 A | 9/2002 |
| CN | 1592361 A | 3/2005 |
| CN | 1741603 A | 3/2006 |

(Continued)

OTHER PUBLICATIONS

International Search Report from the Chinese Patent Office for International Application No. PCT/CN2010/071290 mailed Jul. 8, 2010.

(Continued)

*Primary Examiner* — Lin Ye
*Assistant Examiner* — Dennis Hogue
(74) *Attorney, Agent, or Firm* — Conley Rose, P.C.; Grant Rodolph; Nicholas K. Beaulieu (57) ABSTRACT

A video processing method includes: dividing a currently processed frame into a top field and a bottom field, and performing field exposure on the top field and the bottom field respectively to acquire an exposed top field and an exposed bottom field, where a field exposure time length of the top field and that of the bottom field are different; processing the exposed top field and the exposed bottom field by using a de-interlacing technique to acquire two reconstructed exposed frames; and performing image enhancement processing on the two reconstructed exposed frames to acquire an image of the currently processed frame.

13 Claims, 1 Drawing Sheet

(56) References Cited

FOREIGN PATENT DOCUMENTS

| | | | |
|---|---|---|---|
| CN | 101394487 | A | 3/2009 |
| CN | 101867727 | A | 10/2010 |
| JP | 2007-13776 | A | 1/2007 |

OTHER PUBLICATIONS

Written Opinion of the International Searching Authority in International Application No. PCT/CN2010/071290 mailed Jul. 8, 2010.

* cited by examiner

METHOD AND DEVICE FOR VIDEO PROCESSING USING A NEIGHBORING FRAME TO CALCULATE MOTION INFORMATION

CROSS-REFERENCE TO RELATED APPLICATIONS

This application is a continuation of International Application No. PCT/CN2010/071290, filed on Mar. 25, 2010, which claims priority to Chinese Patent Application No. 200910135223.8, filed on Apr. 16, 2009, both of which are hereby incorporated by reference in their entireties.

FIELD OF THE INVENTION

The present invention relates to the field of signal processing technologies, and in particular, to a method and device for video processing.

BACKGROUND OF THE INVENTION

Digital cameras and digital video cameras have been applied in life in a large scale. In current applications, the digital cameras based on Charge Coupled Devices (CCDs) occupy most of the market, and most of the digital cameras adopt the interlaced scanning technology. In a conventional interlaced CCD image sensor, each frame of image (2N rows) can be divided into a top field (N odd rows) and a bottom field (N even rows). When image processing is performed, exposure, electric charge accumulation, and image enhancement and output are performed on a top field image and a bottom field image successively.

In a video image processing method in the prior art, usually, exposure is performed with a frame as a unit. For example, a video processing technique in the prior art is as follows.

Step A: Acquire a video sequence, and set long exposure and short exposure alternately with a frame as a unit.

Step B: Match and align each pixel of a current frame to a pixel position in a next frame pixel by pixel, and find a most credible pixel from each matched pixel set.

Step C: Use brightness and color information of the pixel to calculate a luminance map.

Step D: Use a tone mapping method to compress the high-bit luminance map into an 8-bit image.

During the research and practice of the prior art, the inventors of the present invention find that for scenarios (for example, a high dynamic range scenario) of complex brightness distribution, scenarios of low illumination, scenarios of highlight shooting, and scenarios of backlight shooting, single exposure using each frame as a pixel unit is incapable of recording a scenario accurately, thereby resulting in degradation of imaging quality.

SUMMARY OF THE INVENTION

Embodiments of the present invention provide a method and device for video processing, so as to improve video image processing quality.

A video processing method includes:

dividing a currently processed frame into a top field and a bottom field, and performing field exposure on the top field and the bottom field respectively to acquire an exposed top field and an exposed bottom field, where the field exposure time length of the top field and that of the bottom field are different;

processing the exposed top field and the exposed bottom field by using a de-interlacing technique to acquire two reconstructed exposed frames; and performing image enhancement processing on the two reconstructed exposed frames to acquire an image of the currently processed frame.

A processing device includes:

an acquisition unit, configured to divide a currently processed frame into a top field and a bottom field, and perform field exposure on the top field and the bottom field respectively to acquire an exposed top field and an exposed bottom field, where the field exposure time length of the top field and that of the bottom field are different;

a reconstruction unit, configured to process the exposed top field and the exposed bottom field by using a de-interlacing technique to acquire two reconstructed exposed frames; and an enhancement unit, configured to perform image enhancement processing on the two reconstructed exposed frames to acquire an image of the currently processed frame.

According to embodiments of the present invention, the field exposure technique and the de-interlacing technique are combined to improve a dynamic range of an output video and maintain an original frame rate of the output video without changing a framework of a camera in the prior art. A top field and a bottom field with different exposure time lengths record details in bright areas and details in dark areas respectively, and a frame acquired by performing de-interlacing processing can show the details in the bright areas and the details in the dark areas simultaneously, thereby improving imaging quality under conditions of complex brightness distribution.

BRIEF DESCRIPTION OF THE DRAWINGS

To illustrate technical solutions according to embodiments of the present invention more clearly, accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

According to an embodiment of the present invention, a video processing method is provided, which can output a high-quality image under conditions of complex brightness distribution. According to an embodiment of the present invention, a corresponding device is further provided. Detailed descriptions are provided respectively as follows.

A currently processed frame is divided into a top field and a bottom field, field exposure is performed on the top field and the bottom field respectively to acquire an exposed top field and an exposed bottom field, and the field exposure time length of the top field and that of the bottom field are different.

Specifically, in operation, a camera analyzes a brightness distribution condition in a scenario of the currently processed frame, sets two exposure time lengths, among which a long exposure time length is used to record details in dark areas and a short exposure time length is used to record details in bright areas, and divides the currently processed frame into a top field and a bottom field, on which field exposure is performed respectively by using the two exposure time lengths, thereby forming an exposed top field and an exposed bottom field with different exposure time lengths.

The exposed top field and the exposed bottom field are processed by using a de-interlacing technique to acquire two reconstructed exposed frames.

Specifically, the exposed top field and the exposed bottom field of the currently processed frame are reconstructed through the de-interlacing technique to acquire a reconstructed long exposed frame and a reconstructed shortly exposed frame.

Image enhancement processing is performed on the two reconstructed exposed frames to acquire an image of the currently processed frame.

Specifically, the frames acquired by reconstructing are enhanced, and the enhancement may adopt one or more methods from of the following methods: high dynamic range image fusion, noise suppression in low illumination, backlight compensation, and highlight suppression.

In the embodiments of the present invention, the field exposure technique and the de-interlacing technique are adopted to improve a dynamic range of an output video and maintain an original frame rate of the output video without changing a framework of a camera in the prior art, thereby improving imaging quality in conditions of complex brightness distribution.

Embodiment 1

Figure 1:
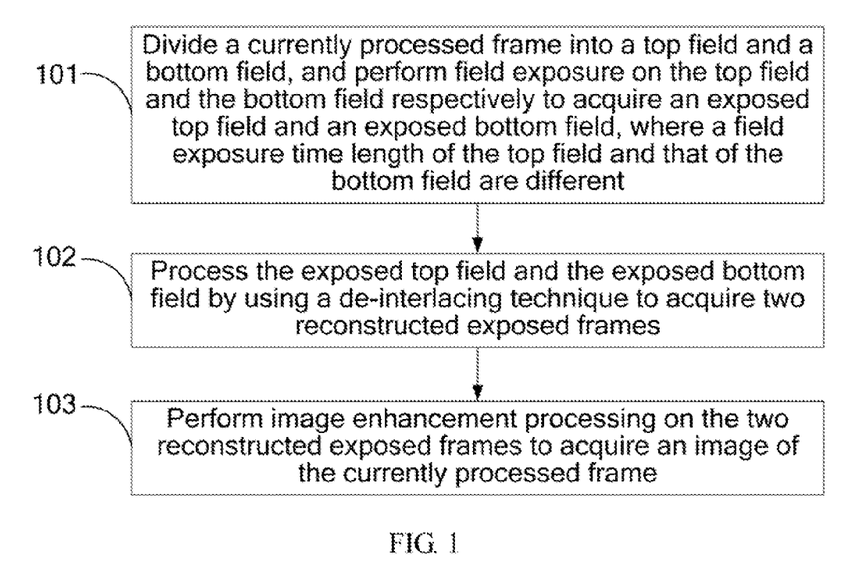
FIG. 1 is a flow chart of an embodiment of a video processing method according to the present invention.

FIG. 1 is a flow chart of an embodiment of a video processing method according to the present invention.

The embodiment is described by using an example of realizing high dynamic range video adjustment through dual-exposure.

Step 101: Divide a currently processed frame into a top field and a bottom field, and perform field exposure on the top field and the bottom field respectively to acquire an exposed top field and an exposed bottom field, where a field exposure time length of the top field and that of the bottom field are different.

Furthermore, before the performing the field exposure on the top field and the bottom field respectively, the method may further include:

analyzing a scenario of the currently processed frame, and selecting a long exposure time length/a short exposure time length capable of recording dark/bright details of the scenario; and setting a top field exposure time length of the currently processed frame as the long exposure time length and setting a bottom field exposure time length of the currently processed frame as the short exposure time length, or setting the top field exposure time length of the currently processed frame as the short exposure time length and setting the bottom field exposure time length of the currently processed frame as the long exposure time length.

Specifically, in operation, a camera may analyze a brightness distribution condition in the scenario of the currently processed frame, and select a long exposure time length and a short exposure time length capable of recording the dark and bright details of the scenario, where the long exposure time length can record details in dark areas and the short exposure time length can record details in bright areas; and set a top/bottom field exposure time length of each frame as a long/short exposure time length or a short/long exposure time length according to communication characteristics of an image sensor. A common image sensor communication interface is a Universal Asynchronous Receiver/Transmitter (UART) or an Inter-Integrated Circuit (IIC) low-speed communication interface, and in the embodiment of the present invention, descriptions are provided by using an example in which the top field adopts a long exposure time length and the bottom field adopts a short exposure time length.

Step 102: Process the exposed top field and the exposed bottom field by using a de-interlacing technique to acquire two reconstructed exposed frames.

Specifically, if the top field exposure time length is set as the long exposure time length and the bottom field exposure time length is set as the short exposure time length, the exposed top field and the exposed bottom field of the currently processed frame are reconstructed by using the de-interlacing technique to acquire a long exposed frame and a shortly exposed frame, which can be realized by using the following method:

using the long exposed top field and the shortly exposed bottom field of the currently processed frame and a top field of a neighboring frame as reference fields to calculate motion information of the bottom field of the currently processed frame;

using the motion information of the bottom field of the currently processed frame and the reference fields to reconstruct the long exposed bottom field of the currently processed frame, which is combined with the long exposed top field of the currently processed frame to form a long exposed frame of current time;

using the long exposed top field and the shortly exposed bottom field of the currently processed frame and a bottom field of a neighboring frame as reference fields to calculate motion information of the top field of the currently processed frame; and using the motion information of the top field of the currently processed frame and the reference fields to reconstruct the shortly exposed top field of the currently processed frame, which is combined with the shortly exposed bottom field of the currently processed frame to form a shortly exposed frame of the current time. Thereby, the two reconstructed frames are acquired: the long exposed frame and the shortly exposed frame.

Similarly, if the top field exposure time length is set as the short exposure time length and the bottom field exposure time length is set as the long exposure time length, the following method can be used:

using the shortly exposed top field and the long exposed bottom field of the currently processed frame and a top field of a neighboring frame as reference fields to calculate motion information of the bottom field of the currently processed frame;

using the motion information of the bottom field of the currently processed frame and the reference fields to reconstruct the shortly exposed bottom field of the currently processed frame, which is combined with the shortly exposed top field of the currently processed frame to form a shortly exposed frame of current time;

using the shortly exposed top field and the long exposed bottom field of the currently processed frame and a bottom field of a neighboring frame as reference fields to calculate motion information of the top field of the currently processed frame; and using the motion information of the top field of the currently processed frame and the reference fields to reconstruct the long exposed top field of the currently processed frame, which is combined with the long exposed bottom field of the currently processed frame to form a long exposed frame of the current time.

Step 103: Perform image enhancement processing on the two reconstructed exposed frames to acquire an image of the currently processed frame.

Specifically, one or more methods from the following methods, high dynamic range image fusion, noise suppression in low illumination, backlight compensation, and highlight suppression, can be used to perform the image enhancement processing on the two reconstructed exposed frames. In the embodiment of the present invention, descriptions are provided by using an example in which the high dynamic range image fusion method is used to perform the image enhancement processing, and the method for the image enhancement processing includes:

acquiring a high dynamic range enhanced image by following steps: using the two reconstructed frames (the reconstructed long exposed frame and the reconstructed shortly exposed frame) as an input value, collecting statistics on brightness information of the two reconstructed frames, analyzing brightness mapping information, calculating a synthesizing weight coefficient with the mapping information being a core and respectively fusing brightness and hues. And then outputting the high dynamic range enhanced image.

Furthermore, during backlight shooting, brightness of most background of an image is higher than that of the focus (a small foreground, for example a human face) of the shooting. In the case, if an image having a large background is taken by using a normal single-exposure technique, a foreground of the acquired image may be dim, and incapable of stressing the focus of the shooting. Although a simple backlight compensation technique can be used to improve imaging quality, the technique also stretches the foreground to sharpen noises, results in change of tones and introduces unnatural revision marks. If a special photometric technique is used to detect the key foreground to be shot, the exposure time length is extended, and the phenomenon of overexposure occurs over a large area of the shot background.

The video processing method based on the field exposure according to the embodiment of the present invention can avoid the phenomenon. Descriptions are provided as follows by using an example of an image exposure processing process when brightness of a background of an image is higher than that of a foreground. Specifically, first, a normal single-exposure technique is used to acquire a short exposure time length suitable for shooting the background. By using a special photometric technique (for example, detecting brightness of a human face or brightness of a moving object), a long exposure time length suitable for shooting a key foreground can be acquired.

Through the de-interlacing technique according to the solutions of the present invention, a complete high-quality reconstructed long/shortly exposed frame can be acquired easily. The long and shortly exposed frames respectively record the large background and the small key foreground. By an image fusion enhancement method, high-quality imaging under conditions of backlight can be achieved.

Furthermore, according to the embodiment of the present invention, after the image of the currently processed frame is acquired, the image of the currently processed frame may be output.

Furthermore, after the image of the currently processed frame is acquired, the video processing process may be repeated to acquire images of multiple frames, and the images of the multiple frames can be used to produce videos.

In the embodiment of the present invention, the field exposure technique and the de-interlacing technique are adopted to improve a dynamic range of an output video and maintain an original frame rate of the output video without changing a framework of a camera in the prior art, thereby improving imaging quality under conditions of the high dynamic range.

Embodiment 2

Figure 2:
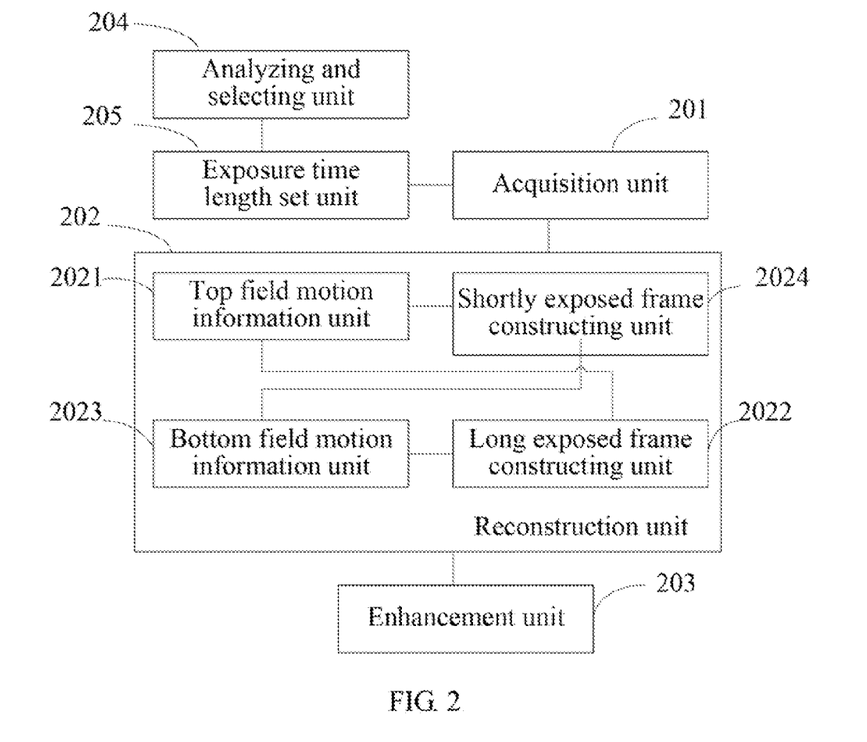
FIG. 2 is a structural diagram of an embodiment of a video processing device according to the present invention.

FIG. 2 is a structural diagram of an embodiment of a video processing device according to the present invention, which includes:

an acquisition unit 201, configured to divide a currently processed frame into a top field and a bottom field, and perform field exposure on the top field and the bottom field respectively to acquire an exposed top field and an exposed bottom field, where the field exposure time length of the top field and that of the bottom field are different;

a reconstruction unit 202, configured to process the exposed top field and the exposed bottom field by using a de-interlacing technique to acquire two reconstructed exposed frames; and an enhancement unit 203, configured to perform image enhancement processing on the two reconstructed exposed frames to acquire an image of the currently processed frame.

Specifically, the enhancement unit 203 uses one or more methods from the following methods, high dynamic range image fusion, noise suppression in low illumination, backlight compensation, and highlight suppression, to perform the image enhancement processing on the two reconstructed exposed frames.

Furthermore, the device further includes:

an analyzing and selecting unit 204, configured to analyze a scenario of the currently processed frame, and select a long exposure time length/a short exposure time length capable of recording dark/bright details of the scenario; and an exposure time length set unit 205, configured to set a top field exposure time length of the currently processed frame as the long exposure time length and set a bottom field exposure time length of the currently processed frame as the short exposure time length, or set the top field exposure time length of the currently processed frame as the short exposure time length and set the bottom field exposure time length of the currently processed frame as the long exposure time length, and inform the acquisition unit of the exposure time lengths set for the top/bottom field.

Specifically, the reconstruction unit further includes a top field motion information unit 2021, a long exposed frame constructing unit 2022, a bottom field motion information unit 2023, and a shortly exposed frame constructing unit 2024.

When the exposure time length set unit 205 sets the top field exposure time length as the long exposure time length and sets the bottom field exposure time length as the short exposure time length, the top field motion information unit 2021 is configured to use the long exposed top field and the shortly exposed bottom field of the currently processed frame and a top field of a neighboring frame as reference fields to calculate motion information of the bottom field of the currently processed frame;

the long exposed frame constructing unit 2022 is configured to use the motion information of the bottom field of the currently processed frame and the reference fields to reconstruct the long exposed bottom field of the currently processed frame, which is combined with the long exposed top field of the currently processed frame to form a long exposed frame of current time;

the bottom field motion information unit 2023 is configured to use the long exposed top field and the shortly exposed bottom field of the currently processed frame and a bottom field of a neighboring frame as reference fields to calculate motion information of the top field of the currently processed frame; and the shortly exposed frame constructing unit 2024 is configured to use the motion information of the top field of the currently processed frame and the reference fields to reconstruct the shortly exposed top field of the currently processed frame, which is combined with the shortly exposed bottom field of the currently processed frame to form a shortly exposed frame of the current time.

Furthermore, when the exposure time length set unit 205 sets the top field exposure time length as the short exposure time length and sets the bottom field exposure time length as the long exposure time length, the bottom field motion information unit 2023 is configured to use the shortly exposed top field and the long exposed bottom field of the currently processed frame and a top field of a neighboring frame as reference fields to calculate motion information of the bottom field of the currently processed frame;

the shortly exposed frame constructing unit 2024 is configured to use the motion information of the bottom field of the currently processed frame and the reference fields to reconstruct the shortly exposed bottom field of the currently processed frame, which is combined with the shortly exposed top field of the currently processed frame to form a shortly exposed frame of current time;

the top field motion information unit 2021 is configured to use the shortly exposed top field and the long exposed bottom field of the currently processed frame and a bottom field of a neighboring frame as reference fields to calculate motion information of the top field of the currently processed frame; and the long exposed frame constructing unit 2022 is configured to use the motion information of the top field of the currently processed frame and the reference fields to reconstruct the long exposed top field of the currently processed frame, which is combined with the long exposed bottom field of the currently processed frame to form a long exposed frame of the current time.

Furthermore, the device may further include an image output unit, configured to output the image of the currently processed frame acquired by the enhancement unit. In the image processing device according to the embodiment of the present invention, the field exposure technique and the de-interlacing technique are adopted to improve a dynamic range of an output video and maintain an original frame rate of the output video without changing a framework of a camera in the prior art, thereby improving imaging quality in conditions of the high dynamic range.

Persons of ordinary skill in the art can understand that all or part of the steps of the methods according to the embodiments of the present invention may be implemented by a program instructing relevant hardware. The program may be stored in a computer readable storage medium, such as a Read Only Memory (ROM), a Random Access Memory (RAM), a magnetic disk, or an optical disk.

The video processing method and device according to the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:
1. A video processing method, comprising:
   dividing a currently processed frame into a top field and a bottom field;
   performing field exposure on the to field and the bottom field respectively to acquire an exposed top field and an exposed bottom field, wherein a field exposure time length of the top field and a field exposure time length of the bottom field are different;
   calculating motion information of the top field or the bottom field using a neighboring frame as a reference field;
   processing the exposed top field and the exposed bottom field by using a de-interlacing technique and the calculated motion information to acquire two reconstructed exposed frames; and
   performing image enhancement processing on the two reconstructed exposed frames to acquire an image of the currently processed frame,
   wherein calculating the motion information of the top field or the bottom field using the neighboring frame as the reference field comprises:
      using a long exposed top field and a shortly exposed bottom field of the currently processed frame and a top field of the neighboring frame as first reference fields to calculate motion information of the bottom field of the currently processed frame; and
      using the long exposed top field and the shortly exposed bottom field of the currently processed frame and a bottom field of the neighboring frame as second reference fields to calculate motion information of the top field of the currently processed frame, and
   wherein processing the exposed top field and the exposed bottom field by using the de-interlacing technique and the calculated motion information to acquire the two reconstructed exposed frames comprises:
      using the motion information of the bottom field of the currently processed frame and the first reference fields to reconstruct the long exposed bottom field of the currently processed frame, which is combined with the long exposed top field of the currently processed frame to form a reconstructed long exposed frame of current time; and
      using the motion information of the top field of the currently processed frame and the second reference fields to reconstruct the shortly exposed top field of the currently processed frame, which is combined with the shortly exposed bottom field of the currently processed frame to form a reconstructed shortly exposed frame of the current time.

2. The video processing method according to claim 1, wherein before performing the field exposure on the top field and the bottom field respectively, the method further comprises:
   analyzing a scenario of the currently processed frame;
   selecting a long exposure time length capable of recording dark details of the scenario and a short exposure time length capable of recording bright details of the scenario; and
   setting a top field exposure time length of the currently processed frame as the long exposure time length and setting a bottom field exposure time length of the currently processed frame as the short exposure time length or setting the top field exposure time length of the currently processed frame as the short exposure time length and setting the bottom field exposure time length of the currently processed frame as the long exposure time length.

3. The video processing method according to claim 1, wherein calculating the motion information of the top field or the bottom field using the neighboring frame as the reference field comprises:
   using the shortly exposed top field and the long exposed bottom field of the currently processed frame and the top field of the neighboring frame as third reference fields to calculate the motion information of the bottom field of the currently processed frame; and
   using the shortly exposed top field and the long exposed bottom field of the currently processed frame and the bottom field of the neighboring frame as fourth reference fields to calculate the motion information of the top field of the currently processed frame,
   wherein processing the exposed top field and the exposed bottom field by using the de-interlacing technique and the calculated motion information to acquire the two reconstructed exposed frames comprises:
      using the motion information of the bottom field of the currently processed frame and the third reference fields to reconstruct the shortly exposed bottom field of the currently processed frame, which is combined with the shortly exposed top field of the currently processed frame to form the reconstructed shortly exposed frame of current time; and
      using the motion information of the top field of the currently processed frame and the fourth reference fields to reconstruct the long exposed top field of the currently processed frame, which is combined with the long exposed bottom field of the currently processed frame to form the reconstructed long exposed frame of the current time.

4. The video processing method according to claim 1, wherein performing the image enhancement processing on the two reconstructed exposed frames comprises using high dynamic range image fusion, noise suppression in low illumination, backlight compensation, or highlight suppression to perform the image enhancement processing on the two reconstructed exposed frames.

5. The video processing method according to claim 1, further comprising repeating the video processing method to acquire images of multiple frames after the image of the currently processed frame is acquired.

6. A video processing device, comprising:
   an image sensor; and
   a processor coupled to the image sensor and configured to:
      divide a currently processed frame into a top field and a bottom field;
      perform field exposure on the top field and the bottom field respectively to acquire an exposed top field and an exposed bottom field, wherein a field exposure time length of the top field and a field exposure time length of the bottom field are different;
      calculate motion information of the top field or the bottom field using a neighboring frame as a reference field;
      process the exposed top field and the exposed bottom field by using a de-interlacing technique and the calculated motion information to acquire two reconstructed exposed frames;
      perform image enhancement processing on the two reconstructed exposed frames to acquire an image of the currently processed frame;
      use the long exposed top field and the shortly exposed bottom field of the currently processed frame and a top field of the neighboring frame as first reference fields to calculate motion information of the bottom field of the currently processed frame;
      use the motion information of the bottom field of the currently processed frame and the first reference fields to reconstruct the long exposed bottom field of the currently processed frame, which is combined with the long exposed top field of the currently processed frame to form a reconstructed long exposed frame of current time;
      use the long exposed top field and the shortly exposed bottom field of the currently processed frame and a bottom field of the neighboring frame as second reference fields to calculate motion information of the top field of the currently processed frame;
      use the motion information of the top field of the currently processed frame and the second reference fields to reconstruct the shortly exposed top field of the currently processed frame, which is combined with the shortly exposed bottom field of the currently processed frame to form a reconstructed shortly exposed frame of the current time or use the shortly exposed top field and the long exposed bottom field of the currently processed frame and a top field of the neighboring frame as third reference fields to calculate motion information of the bottom field of the currently processed frame;
      use the motion information of the bottom field of the currently processed frame and the third reference fields to reconstruct the shortly exposed bottom field of the currently processed frame, which is combined with the shortly exposed top field of the currently processed frame to form a reconstructed shortly exposed frame of current time;
      use the shortly exposed top field and the long exposed bottom field of the currently processed frame and a bottom field of the neighboring frame as fourth reference fields to calculate motion information of the top field of the currently processed frame; and
      use the motion information of the top field of the currently processed frame and the fourth reference fields to reconstruct the long exposed top field of the currently processed frame, which is combined with the long exposed bottom field of the currently processed frame to form a reconstructed long exposed frame of the current time.

7. The video processing device according to claim 6, wherein the processor is further configured to:

analyze a scenario of the currently processed frame;

select a long exposure time length capable of recording dark details of the scenario and a short exposure time length capable of recording bright details of the scenario;

set a top field exposure time length of the currently processed frame as the long exposure time length and set a bottom field exposure time length of the currently processed frame as the short exposure time length or set the top field exposure time length of the currently processed frame as the short exposure time length and set the bottom field exposure time length of the currently processed frame as the long exposure time length; and send indications of the exposure time length set for the top field and the exposure time length set for the bottom field.

8. The video processing device according to claim 6, wherein the processor is configured to use high dynamic range image fusion, noise suppression in low illumination, backlight compensation, or highlight suppression to perform the image enhancement processing on the two reconstructed exposed frames to acquire the image of the currently processed frame.

9. A video processing method, comprising:

dividing a currently processed frame into a top field and a bottom field;

performing field exposure on the top field and the bottom field respectively to acquire an exposed top field and an exposed bottom field, wherein a field exposure time length of the top field and a field exposure time length of the bottom field are different;

processing the exposed top field and the exposed bottom field by using a de-interlacing technique to acquire two reconstructed exposed frames; and performing image enhancement processing on the two reconstructed exposed frames to acquire an image of the currently processed frame, wherein processing the exposed top field and the exposed bottom field by using the de-interlacing technique to acquire the two reconstructed exposed frames comprises:

using the shortly exposed top field and the long exposed bottom field of the currently processed frame and a top field of a neighboring frame as reference fields to calculate motion information of the bottom field of the currently processed frame;

using the motion information of the bottom field of the currently processed frame and the reference fields to reconstruct the shortly exposed bottom field of the currently processed frame, which is combined with the shortly exposed top field of the currently processed frame to form a reconstructed shortly exposed frame of current time;

using the shortly exposed top field and the long exposed bottom field of the currently processed frame and a bottom field of the neighboring frame as second reference fields to calculate motion information of the top field of the currently processed frame; and using the motion information of the top field of the currently processed frame and the second reference fields to reconstruct the long exposed top field of the currently processed frame, which is combined with the long exposed bottom field of the currently processed frame to form a reconstructed long exposed frame of the current time.

10. The video processing method according to claim 9, wherein before performing the field exposure on the top field and the bottom field respectively, the method further comprises:

analyzing a scenario of the currently processed frame;

selecting a long exposure time length capable of recording dark details of the scenario and a short exposure time length capable of recording bright details of the scenario; and setting a top field exposure time length of the currently processed frame as the long exposure time length and setting a bottom field exposure time length of the currently processed frame as the short exposure time length or setting the top field exposure time length of the currently processed frame as the short exposure time length and setting the bottom field exposure time length of the currently processed frame as the long exposure time length.

11. The video processing method according to claim 9, wherein processing the exposed top field and the exposed bottom field by using the de-interlacing technique to acquire the two reconstructed exposed frames comprises:

using the long exposed top field and the shortly exposed bottom field of the currently processed frame and a top field of the neighboring frame as first reference fields to calculate motion information of the bottom field of the currently processed frame;

using the motion information of the bottom field of the currently processed frame and the first reference fields to reconstruct the long exposed bottom field of the currently processed frame, which is combined with the long exposed top field of the currently processed frame to form a reconstructed long exposed frame of current time;

using the long exposed top field and the shortly exposed bottom field of the currently processed frame and a bottom field of the neighboring frame as second reference fields to calculate motion information of the top field of the currently processed frame; and using the motion information of the top field of the currently processed frame and the second reference fields to reconstruct the shortly exposed top field of the currently processed frame, which is combined with the shortly exposed bottom field of the currently processed frame to form a reconstructed shortly exposed frame of the current time.

12. The video processing method according to claim 9, wherein performing the image enhancement processing on the two reconstructed exposed frames comprises using high dynamic range image fusion, noise suppression in low illumination, backlight compensation, or highlight suppression to perform the image enhancement processing on the two reconstructed exposed frames.

13. The video processing method according to claim 9, further comprising repeating the video processing method to acquire images of multiple frames after the image of the currently processed frame is acquired.

* * * * *

UNITED STATES PATENT AND TRADEMARK OFFICE
CERTIFICATE OF CORRECTION

PATENT NO. : 8,749,699 B2
APPLICATION NO. : 13/273743
DATED : June 10, 2014
INVENTOR(S) : Hai Chen et al.

It is certified that error appears in the above-identified patent and that said Letters Patent is hereby corrected as shown below:

In the claims:

Column 8, Lines 19-60, Claim 1, should read as:
"1. A video processing method, comprising:
dividing a currently processed frame into a top field and a bottom field;
performing field exposure on the top field and the bottom field respectively to acquire an exposed top field and an exposed bottom field, wherein a field exposure time length of the top field and a field exposure time length of the bottom field are different;
calculating motion information of the top field or the bottom field using a neighboring frame as a reference field;
processing the exposed top field and the exposed bottom field by using a de-interlacing technique and the calculated motion information to acquire two reconstructed exposed frames; and
performing image enhancement processing on the two reconstructed exposed frames to acquire an image of the currently processed frame,
wherein calculating the motion information of the top field or the bottom field using the neighboring frame as the reference field comprises:
using a long exposed top field and a shortly exposed bottom field of the currently processed frame and a top field of the neighboring frame as first reference fields to calculate motion information of the bottom field of the currently processed frame; and
using the long exposed top field and the shortly exposed bottom field of the currently processed frame and a bottom field of the neighboring frame as second reference fields to calculate motion information of the top field of the currently processed frame, and
wherein processing the exposed top field and the exposed bottom field by using the de-interlacing technique and the calculated motion information to acquire the two reconstructed exposed frames comprises:
using the motion information of the bottom field of the currently processed frame and the first reference fields to reconstruct the long exposed bottom field of the currently processed frame, which is combined with the long exposed top field of the currently processed frame to form a reconstructed long exposed frame of current time; and"

Signed and Sealed this
Twenty-first Day of October, 2014

Michelle K. Lee
*Deputy Director of the United States Patent and Trademark Office*

CERTIFICATE OF CORRECTION (continued)
U.S. Pat. No. 8,749,699 B2

In the claims:

Column 8, Lines 61-67, Claim 1, should read as:
"using the motion information of the top field of the currently processed frame and the second reference fields to reconstruct the shortly exposed top field of the currently processed frame, which is combined with the shortly exposed bottom field of the currently processed frame to form a reconstructed shortly exposed frame of the current time."